United States Patent
Hedayati

(10) Patent No.: US 10,700,604 B2
(45) Date of Patent: Jun. 30, 2020

(54) HIGH PERFORMANCE SWITCH DEVICES AND METHODS FOR OPERATING THE SAME

(71) Applicant: Atlazo, Inc., La Jolla, CA (US)

(72) Inventor: Hajir Hedayati, San Diego, CA (US)

(73) Assignee: ATLAZO, INC., La Jolla, CA (US)

( * ) Notice: Subject to any disclaimer, the term of this patent is extended or adjusted under 35 U.S.C. 154(b) by 0 days.

(21) Appl. No.: 16/295,876

(22) Filed: Mar. 7, 2019

(65) Prior Publication Data
US 2019/0280593 A1    Sep. 12, 2019

Related U.S. Application Data

(60) Provisional application No. 62/639,845, filed on Mar. 7, 2018.

(51) Int. Cl.
| | | |
|---|---|---|
| *H02M 3/156* | (2006.01) | |
| *G05F 1/46* | (2006.01) | |
| *H02M 3/158* | (2006.01) | |
| *H02M 1/00* | (2006.01) | |

(52) U.S. Cl.
CPC .......... *H02M 3/156* (2013.01); *G05F 1/462* (2013.01); *H02M 3/158* (2013.01); *H02M 2001/0003* (2013.01); *H02M 2001/0048* (2013.01); *H02M 2001/0054* (2013.01)

(58) Field of Classification Search
CPC ....... H02M 3/155–158; H02M 3/1584; H02M 3/1588; H02M 2001/0003; H02M 2001/0054; G05F 1/462
USPC .......................................... 323/282–285, 311
See application file for complete search history.

(56) References Cited

U.S. PATENT DOCUMENTS

| | | | |
|---|---|---|---|
| 5,481,178 A * | 1/1996 | Wilcox | H02M 3/156 323/224 |
| 6,636,022 B2 | 10/2003 | Sluijs | |
| 7,174,523 B2 | 2/2007 | Engel et al. | |
| 7,298,119 B1 | 11/2007 | Summit et al. | |
| 7,487,474 B2 | 2/2009 | Ciplickas | |
| 7,552,409 B2 | 6/2009 | Kucukcakar | |

(Continued)

FOREIGN PATENT DOCUMENTS

JP         2014064436 A1    4/2014

OTHER PUBLICATIONS

Qian, J. et al. (Dec. 2009). Single-inductor Dual-output DC/DC Buck converter With High full-load Efficiency. 10.1109/EDSSC.2009.5394235. (3 pages).

(Continued)

*Primary Examiner* — Yemane Mehari
(74) *Attorney, Agent, or Firm* — Perkins Coie LLP

(57) ABSTRACT

Devices, methods and systems provide improved performance for voltage converters and enable more efficient operations by reducing energy loss in a head switch of the voltage converter. These improvements are achieved in-part by reducing one or both of an ohmic conduction loss and a switching loss of the head switch. One example floating head switch includes an n-type metal oxide semiconductor (NMOS) transistor, a capacitor, one or more drivers and an active low switch. The capacitor ends are connected to the supply voltages of the drivers and the active low switch is coupled to, and controlled by, the output of the one or more drivers and turns on or off in response to a change in the input voltage.

20 Claims, 9 Drawing Sheets

(56) References Cited

U.S. PATENT DOCUMENTS

| | | | |
|---|---|---|---|
| 7,913,071 B2 | 3/2011 | Mallik et al. | |
| 7,969,133 B2* | 6/2011 | Zhang | G05F 1/67 323/283 |
| 8,018,212 B1 | 9/2011 | Petricek | |
| 8,049,568 B2 | 11/2011 | Youssef et al. | |
| 8,051,398 B2 | 11/2011 | Bittlestone | |
| 8,129,961 B2 | 3/2012 | Buethker | |
| 8,169,203 B1 | 5/2012 | Vemula | |
| 8,307,317 B2 | 11/2012 | Adams | |
| 8,464,199 B1 | 6/2013 | Charlebois et al. | |
| 8,543,966 B2 | 9/2013 | Bickford | |
| 8,692,584 B2 | 4/2014 | Nakamura et al. | |
| 8,988,905 B2* | 3/2015 | Lin | H02M 1/32 363/147 |
| 9,281,780 B2 | 3/2016 | Yayama et al. | |
| 9,317,048 B2 | 4/2016 | Kuang | |
| 9,408,266 B2* | 8/2016 | Logiudice | H05B 45/50 |
| 9,503,106 B1 | 11/2016 | Ding et al. | |
| 9,698,674 B1 | 7/2017 | Cherkassky et al. | |
| 9,829,911 B2 | 11/2017 | Yayama et al. | |
| 9,915,963 B1 | 3/2018 | Wu | |
| 10,222,852 B2 | 3/2019 | Foreman | |
| 10,236,763 B2* | 3/2019 | Hu | H02M 3/156 |
| 10,416,746 B2 | 9/2019 | Solki | |
| 2005/0184711 A1 | 8/2005 | Chen et al. | |
| 2006/0114017 A1 | 6/2006 | El-kik | |
| 2007/0018712 A1 | 1/2007 | Gk | |
| 2007/0089078 A1 | 4/2007 | Engel | |
| 2008/0122291 A1* | 5/2008 | Uchimoto | H02M 3/1584 307/31 |
| 2008/0157729 A1* | 7/2008 | Chan | H02M 3/07 323/225 |
| 2009/0037854 A1 | 2/2009 | Bittlestone | |
| 2009/0284240 A1 | 11/2009 | Zhang | |
| 2010/0052635 A1 | 3/2010 | Wang | |
| 2010/0194434 A1 | 8/2010 | Tran Vo | |
| 2010/0327952 A1 | 12/2010 | Wu | |
| 2011/0248764 A1 | 10/2011 | Das | |
| 2011/0267017 A1 | 11/2011 | Zhang et al. | |
| 2012/0119715 A1* | 5/2012 | Loikkanen | H02M 3/1582 323/235 |
| 2012/0124538 A1 | 5/2012 | Lackey | |
| 2012/0159216 A1 | 6/2012 | Wells | |
| 2013/0069608 A1 | 3/2013 | Gakhar et al. | |
| 2013/0099764 A1 | 4/2013 | Zhang et al. | |
| 2013/0271100 A1 | 10/2013 | El-Nozahi | |
| 2014/0132228 A1* | 5/2014 | Lin | H02M 1/32 323/207 |
| 2014/0152344 A1 | 6/2014 | Chiou | |
| 2014/0225579 A1* | 8/2014 | Dally | G05F 1/10 323/271 |
| 2014/0232360 A1* | 8/2014 | Dally | G05F 1/563 323/266 |
| 2015/0198960 A1 | 7/2015 | Zhang et al. | |
| 2015/0214841 A1* | 7/2015 | Ramorini | H02M 3/158 323/271 |
| 2016/0077537 A1 | 3/2016 | Enjalbert et al. | |
| 2016/0094125 A1 | 3/2016 | Milanesi et al. | |
| 2016/0118894 A1* | 4/2016 | Zhang | H02M 1/08 323/271 |
| 2016/0164497 A1 | 6/2016 | Agarwal | |
| 2016/0334818 A1 | 11/2016 | Singh | |
| 2016/0359421 A1* | 12/2016 | Lin | H02M 3/33592 |
| 2017/0033698 A1* | 2/2017 | Vemuri | H02M 3/33592 |
| 2017/0093350 A1 | 3/2017 | Ramos et al. | |
| 2017/0115678 A1 | 4/2017 | Qing et al. | |
| 2017/0160757 A1 | 6/2017 | Yang | |
| 2017/0272073 A1 | 9/2017 | Betz | |
| 2018/0120879 A1 | 5/2018 | Du et al. | |
| 2018/0173258 A1 | 6/2018 | Singh | |
| 2018/0284829 A1 | 10/2018 | Hussien et al. | |
| 2018/0321092 A1 | 11/2018 | Jones | |
| 2019/0131876 A1 | 5/2019 | Luff | |
| 2019/0212799 A1 | 7/2019 | Solki et al. | |
| 2019/0213292 A1 | 7/2019 | Solki et al. | |
| 2019/0214906 A1* | 7/2019 | Mahmoudi | G06F 1/263 |
| 2019/0235566 A1 | 8/2019 | Ensafdaran | |
| 2019/0258283 A1 | 8/2019 | Pishdad et al. | |

OTHER PUBLICATIONS

Tao, C. et al. (Nov. 2011). A Buck Converter With Reduced Output Spurs Using Asynchronous Frequency Hopping. IEEE Transactions on Circuits and Systems—II: Express Briefs, vol. 58, No. 11, p. 709-713. (5 pages).

Ko, Y. et al. (Jun. 2014) Load-Balance-Independent High Efficiency Single-Inductor Multiple-Output (SIMO) DC-DC Converters. Journal of Semiconductor Technology and Science, vol. 14, No. 3., p. 300-312. (13 pages).

Harris, David M. Det al., "A transregional model for near-threshold circuits with application to minimum-energy operation," in Proc. 2010 Int. Conf. Microelectronics (ICM), Cairo, Egypt, Dec. 19-22, 2010, pp. 64-67.

S. Kosonocky et al., "Designing in Scaled Technologies: 32nm and Beyond," presented at 2012 Symposia on VLSI Technology and Circuits, Honolulu, HI, Jun. 2012.

Jungseob Lee et al., "Improving Throughput of Power-Constrained GPUs Using Dynamic Voltage/Frequency and Core Scaling," in Proc. 2011 Int. Conf. Parallel Architectures and Compilation Techniques (PACT), Galveston, TX, Oct. 10-14, 2011, pp. 111-120.

Massimo Alioto, "Ultra-Low Power VLSI Circuit Design Demystified and Explained: A Tutorial," IEEE Trans. Circuits Syst. I, Reg. Papers, vol. 59, pp. 3-29, Jan. 2012.

Alice Wang, et al., "Optimal supply and threshold scaling for subthreshold CMOS circuits," in Proc. 2002 IEEE Computer Society Annu. Symp. VLSI, Pittsburg, PA, Apr. 25-26, 2002, pp. 5-9.

Bo Zhai et al., "Energy-Efficient Subthreshold Processor Design," IEEE Trans. Very Large Scale Integr. (VLSI) Syst., vol. 17, pp. 1127-1137, Aug. 2009.

Y. Pu et al., "Misleading energy and performance claims in sub/near threshold digital systems," in Proc. 2010 IEEE/ACM Int. Conf. Computer-Aided Design (ICCAD), San Jose, CA, Nov. 7-11, 2010, pp. 625-631.

D. Bol et al., "Interests and Limitations of Technology Scaling for Subthreshold Logic," IEEE Trans. Very Large Scale Integr. (VLSI) Syst., vol. 17, pp. 1508-1519, Oct. 2009.

S. Jain et al., "A 280mV-to-1.2V wide-operating-range IA-32 processor in 32nm CMOS," in Digest of Technical Papers 2012 IEEE Int. Solid-State Circuits Conf. (ISSCC), San Francisco, CA, Feb. 19-23, 2012, pp. 66-68.

D. Wolpert and P. Ampadu, "Exploiting Programmable Temperature Compensation Devices to Manage Temperature-Induced Delay Uncertainty," IEEE Trans. Circuits and Syst. I: Reg. Papers, vol. 59, pp. 735-748, Apr. 2012.

BSIM4.3.0 MOSFET Model—User's Manual, Department of Electrical Engineering and Computer Sciences, University of California, Berkeley, CA, 2003.

M. Faisal, N. E. Roberts and D. D. Wentzloff, "A 300nW near-threshold 187.5-500 kHz programmable clock generator for ultra low power SoCs," 2015 IEEE SOI-3D-Subthreshold Microelectronics Technology Unified Conference (S3S), Rohnert Park, CA, 2015, pp. 1-3.

M. Huang and C. Hung, "Full-custom all-digital phase locked loop for clock generation," VLSI Design, Automation and Test(VLSI-DAT), Hsinchu, 2015, pp. 1-4.

J. Liu et al., "A 0.8V, sub-mW, varactor-tuning ring-oscillator-based clock generator in 32nm CMOS," IEEE Asian Solid-State Circuits Conference 2011, Jeju, 2011, pp. 337-340.

A. Tajalli and Y. Leblebici, "A 9 pW/Hz adjustable clock generator with 3-decade tuning range for dynamic power management in subthreshold SCL systems," 2010 Proceedings of ESSCIRC, Seville, 2010, pp. 242-245.

X. Zhang and A. B. Apsel, "A Low-Power, Process-and-Temperature-Compensated Ring Oscillator With Addition-Based Current Source," in IEEE Transactions on Circuits and Systems I: Regular Papers, vol. 58, No. 5, pp. 868-878, May 2011.

(56) References Cited

OTHER PUBLICATIONS

Man et al, "A High Slew-Rate Push-Pull Output Amplifier for Low-Quiescent Current Low-Dropout Regulators With Transient-Response Improvement", IEEE Transactions on Circuits and Systems II: Express Briefs, 2007.
Y. Lu, et al., "A 0.65ns-Response-Time 3.01ps FOM Fully-Integrated Low-Dropout Regulator with Full-Spectrum Power-Supply-Rejection for Wideband Communication Systems", IEEE ISSCC, pp. 306-307, Feb. 2014.
Chen, Y. et. al, "An Ultra-low Quiescent Current Output Capacitor-less Low-Dropout Regulator with a Novel Slew-rate-enhanced Circuit", 2014 IEEE International Symposium on Radio-Frequency Integration Technology.
X. Ming, et al, "A Low-Power Ultra-Fast Capacitor-Less LDO With Advanced Dynamic Push-Pull Techniques", International Conference on VLSI and System-on-Chip, pp. 54-59, 2011.
Liu et al, "An Ultra-Low Power Voltage Regulator for RFID Application", Chia-Chin, Chunhong Chen, 2013 IEEE 56th International Midwest Symposium on Circuits and Systems (MWSCAS).
Liu et al, "A 90nA quiescent current 1.5V-5V 50mA asynchronous folding LDO using dual loop control", 2016 IEEE Asian Solid-State Circuits Conference (A-SSCC).
Mazumdar et al, "A Digitally-Controlled Power-Aware Low-Dropout Regulator to Reduce Standby Current Drain in Ultra-Low-Power MCU", 2015 International Symposium on Quality Electronic Design.
Liang et al, "A 802 nA Quiescent Current and 100 mA Load Low-Dropout Regulator for Micro Energy Harvest System", 2018 13th IEEE Conference on Industrial Electronics and Applications (ICIEA).
Rikan et. al, "A low leakage retention LDO and leakage-based BGR with 120nA quiescent current", 2017 International SoC Design Conference (ISOCC).
Chien-Yi Wu et al, "An ultra-low power capacitor-less LDO for always-on domain in NB-IoT applications", 2018 IEEE International Conference on Applied System Invention (ICASI).
Solki, Shahin et al. U.S. Appl. No. 16/242,405 Non-Final Office Action dated Mar. 29, 2019.
Solki, Shahin et al. U.S. Appl. No. 16/244,509 Non-Final Office Action dated Mar. 28, 2019.
International Application No. PCT/US/2019/012414 International Search Report and Written Opinion dated May 8, 2019.
Solki, Shahin et al. U.S. Appl. No. 16/244,509 Notice of Allowance dated Jul. 17, 2019.
Hedayati, Hajir et al. U.S. Appl. No. 16/295,876 Non-Final Office Action dated Sep. 12, 2019.
Pishdad, Bardia et al. U.S. Appl. No. 16/281,021 Non-Final Office Action dated Jul. 10, 2019.
Ensafdaran, Masoud et al. U.S. Appl. No. 16/265,648 Non-Final Office Action dated Aug. 9, 2019.
Solki, Shahin et al. U.S. Appl. No. 16/242,405 Non-final Office Action dated Sep. 25, 2019.
Mahmoudi, Farsheed, et al. U.S. Appl. No. 16/240,557 Non-Final Office Action dated Aug. 2, 2019.
Pishdad, Bardia et al. U.S. Appl. No. 16/281,021 Notice of Allowance dated Oct. 17, 2019.

* cited by examiner

| Without Body Biasing | With Body Biasing |
|---|---|
| 65% | 82% |//
| 3.6V input 1V output (1uA) | |

FIG. 8

HIGH PERFORMANCE SWITCH DEVICES AND METHODS FOR OPERATING THE SAME

CROSS-REFERENCE TO RELATED APPLICATIONS

This patent document claims priority to and benefits of U.S. Provisional Patent Application No. 62/639,845 entitled "HIGH PERFORMANCE SWITCH DEVICES AND METHODS FOR OPERATING THE SAME" and filed on Mar. 7, 2018. The entire content of the before-mentioned patent application is incorporated by reference as part of the disclosure of this patent document.

TECHNICAL FIELD

This patent document relates to power management and in particular to voltage converter devices and related methods.

BACKGROUND

The Internet of things (IoT) is the network of physical devices that can include appliances, vehicles and other devices that have embedded electronics, software, and network connectivity to enable these physical devices to connect and exchange data. Each physical device of the IoT can be uniquely identifiable through its embedded computing system and is able to communicate with other devices using the existing infrastructure of the Internet. While not limited to IOT, the small form factor, ultra-low power consumption, and low cost requirements make power consumption and physical footprint of the associated circuitry critically important in IoT and many other applications since they directly impact the battery lifetime, cost and efficiency of such systems.

Many battery powered electronic devices include a battery that produces one voltage that is different from one or more voltages required by the electronics in the battery powered device. The voltage(s) required by the device are produced by one or more DC-DC converters. The power efficiency of these converters has a direct impact on the battery life. Therefore, there is a need for power management and regulation circuits that can efficiently provide multiple voltage values.

BRIEF DESCRIPTION OF THE DRAWINGS

FIG. 8 shows results obtained with and without implementation of body biasing for an exemplary voltage regulator circuit configuration.

DETAILED DESCRIPTION

In the following description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

One of the main factors affecting the efficiency of a DC-DC converter is thermal loss. Thermal loss is caused by the resistance in the current path; i.e., the path that delivers the current from the power source (e.g., a battery) to the load. In a typical switching convertor, the resistance is mainly due to switches that are positioned in the current path, as well as losses in the inductor (please refer to FIG. 1 for an example of such switching converter). Figure of Merit (FoM) for designing a power switch includes the switch ohmic resistance (which determines the thermal loss) and gate capacitance (which determines the required power to turn on and turn off the switch). The switch resistance is a function of the switch size and the gate-source voltage as provided by the following relationship for an exemplary transistor that is configured to operate as a switch:

$$R_{SW} \approx \frac{1}{\beta \frac{W}{L}(V_{GS} - V_{th})}. \tag{1}$$

In Equation (1), $\beta$, is a function of the transistor physics, W is the width of the transistor, L is the length of the transistor, $V_{GS}$ is the gate to source voltage, and $V_{th}$ is the transistor threshold voltage. It is evident from Equation (1) that $R_{SW}$ and $V_{GS}$ are inversely proportional to each other. Therefore, an increase in $V_{GS}$ results in a decrease in $R_{SW}$. The ohmic loss associated with the switch is:

$$\text{Loss}_{Ohmic} = R_{SW} \times I_{RMS}^2 \tag{2}$$

In Equation (2), $I_{RMS}$ is the root mean square (RMS) current flowing through the resistor (switch), $R_{SW}$. Equation (1) also reveals that an increase in the width, W, of the transistor results in a reduction in resistance. However, increasing the width of the transistor increases the capacitance, which adversely affects the switching loss. The switching loss of switch is associated with the switch gate capacitance as follows:

$$\text{Loss}_{Switch} = C_{SW} \times V_G^2 \tag{3}$$

In Equation (3), $C_{SW}$ is the switch gate capacitance, and $V_G$ is the switch gate voltage.

In a typical switching converter (see, e.g., FIG. 1), the floating switch (also sometimes referred to as the head switch, $SW_{HD}$) can be a major source of ohmic and switching losses. In particular, as opposed to a non-floating switch, the voltage values at both ends of a floating switch can change, thus making it difficult to optimize the losses in a floating switch. As described below, this difficulty is further exacerbated when the floating switch is implemented using both PMOS and NMOS transistors.

Figure 1:
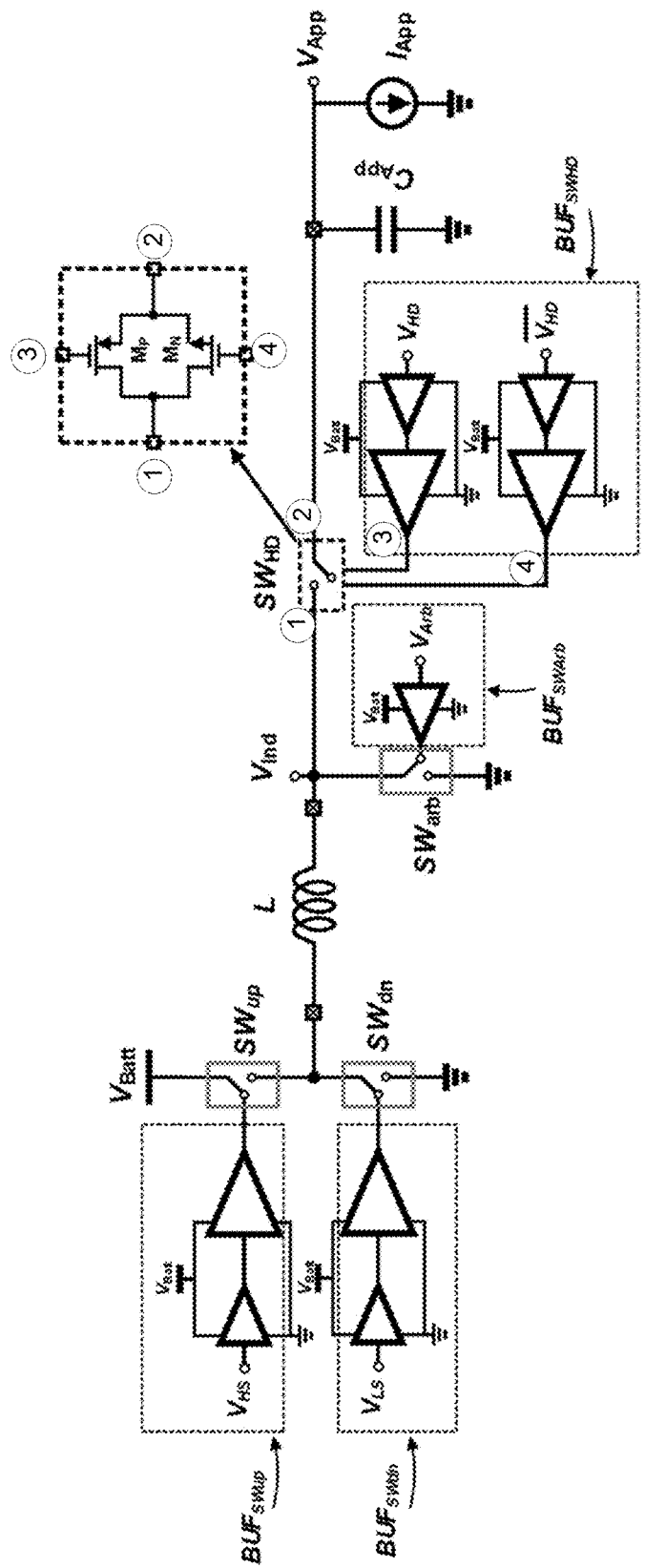
FIG. 1 illustrates an example switching converter circuit.

To further illustrate the challenges in implementing a floating switch, FIG. 1 shows an example implementation of a floating head switch, $SW_{HD}$, where a combination of both PMOS and NMOS transistors ($M_p$ and $M_n$ in FIG. 1, respectively) are used. Note that in FIG. 1, the numbers 1 through 4 (inside circles) are provided to illustrate the connections of the transistors in the floating switch configuration to other circuit components. The triangular shaped elements in FIG. 1 (and the remaining figures of this document) are drivers that are used to drive the various switches; note that in some instances two drivers are used to drive a particular switch. Since the switch $SW_{HD}$ is floating between the output load (e.g., the node showing $V_{App}$ in FIG. 1) and the inductor (e.g., the node showing $V_{ind}$ in FIG. 1), the driving strength ($V_{GS}$) for both the NMOS and PMOS transistors of the floating switch changes depending on the output voltage (i.e., the $V_{App}$ value). Therefore, the floating switch resistance is a function of the output voltage. A conventional design of the head switch includes a transmission gate, such as the configuration in FIG. 1 having both PMOS and NMOS transistors (see the transistors in the dotted box at the top right side, depicting an implementation of the floating head switch). In this scenario, the driving ON voltage is limited to the battery voltage and cannot be pushed any higher. For mid-range application voltages, both PMOS and NMOS transistors are fully ON (e.g., the $V_{GS}$ value is at or close to $V_{Batt}$), and minimum resistance is achieved. However, if the application voltage, $V_{APP}$, approaches the supply voltage or the ground voltage, the switch resistance increases since either the PMOS or the NMOS switch is only partially ON (i.e., the full value of $V_{GS}$ to allow optimized operation is not achieved). Therefore, the switch's ohmic loss becomes a function of the application voltage and can significantly degrade as the application voltage approaches the supply voltage (or the ground). Another drawback of the conventional head switch design is that the two gates are driven at the same time, which further increases the switching loss. Since mobility in a PMOS transistor is smaller than of an NMOS counterpart, the degradation in switching loss in such a conventional floating switch is more than 50%, and up to 80% depending on the technology.

Figure 2:
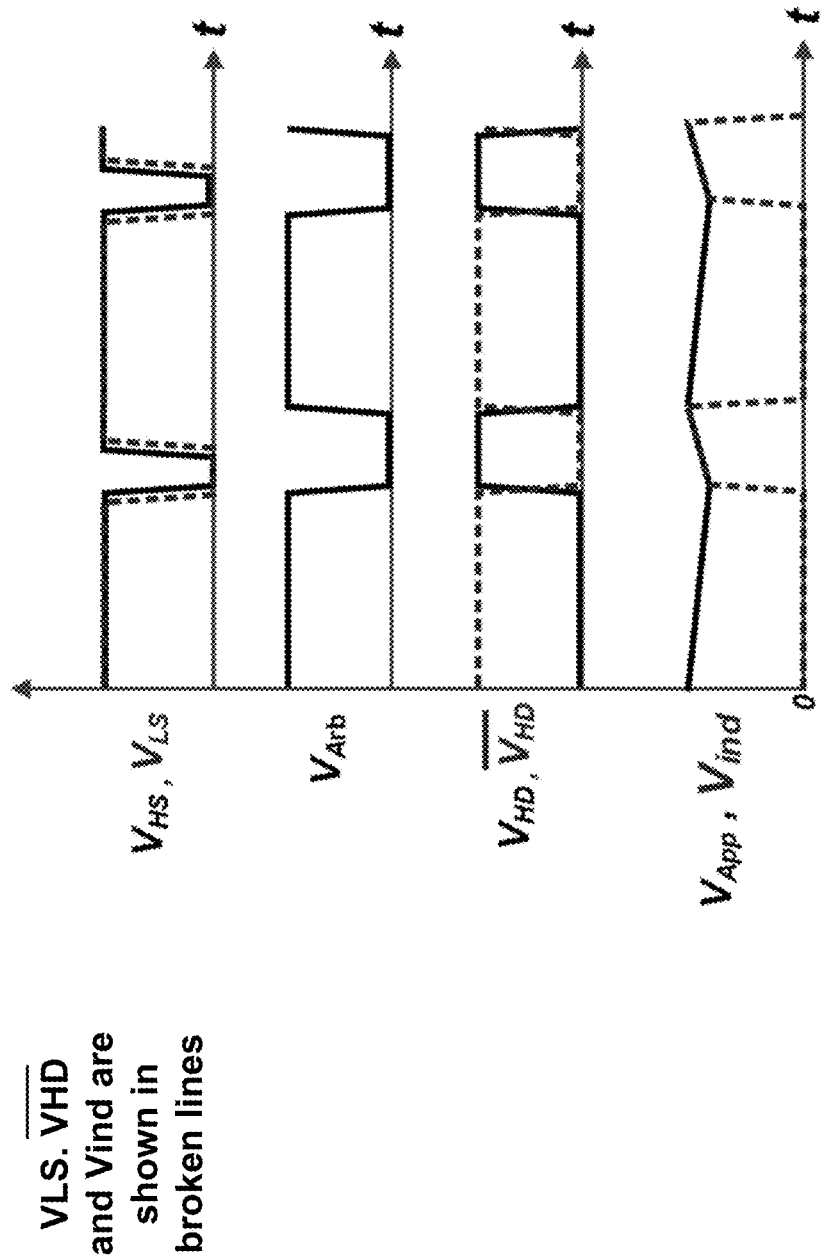
FIG. 2 illustrates a set of exemplary voltage versus time waveforms associated with certain nodes in the circuit of FIG. 1.

FIG. 2 shows exemplary set of waveforms associated with FIG. 1. In obtaining the waveforms of FIG. 2, it is assumed that $SW_{UP}$ is implemented via a PMOS transistor, while $SW_{DN}$, and $SW_{Arb}$ are implemented using NMOS transistors. The buffers (or drivers) for each switch are shown using the $BUF_{SW}$ notation. As shown in FIG. 2, the application voltage ($V_{App}$) sets the margin for $V_{GS}$ on the head switch's PMOS and NMOS transistors. In case of the NMOS transistor:

$$V_{GS}=V_{Batt}-V_{App} \qquad (4).$$

As the application voltage increases, $V_{GS}$ decreases, which increases the ohmic loss of the switch, and degrades the DC-DC power converter efficiency.

The disclosed embodiments, among other features and benefits, describe methods, systems and devices with improved performance, which enable a switching voltage converter to operate more efficiently by reducing the energy loss in its head switch. These improvements are achieved by reducing one or both of an ohmic conduction loss and a switching loss of the floating head switch, as well by additional features that are described herein.

In some embodiments, to reduce the conduction loss, the head switch is implemented with one or more NMOS transistors. For transistors having the same size, NMOS transistors provide better electron mobility and thus produce smaller switch resistance. However, one of the challenges in using an NMOS transistor is the degradation of the ohmic loss as the application voltage increases in approaching the supply voltage.

Figure 3:
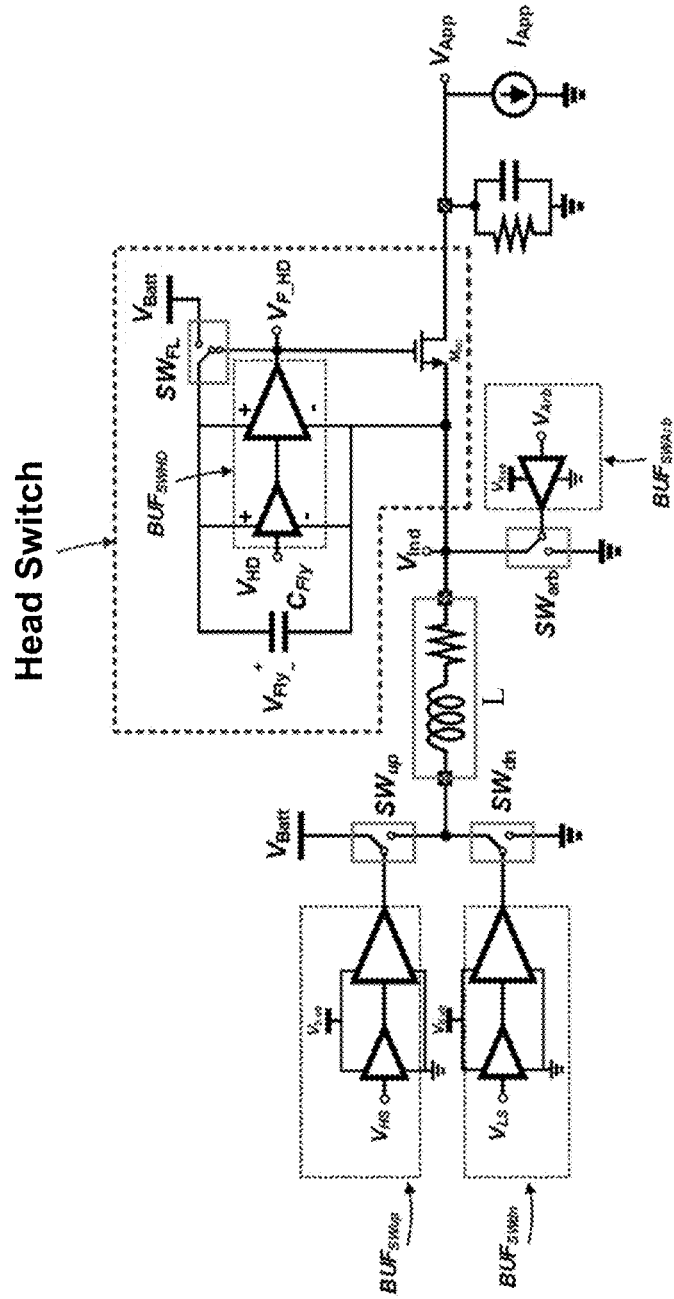
FIG. 3 illustrates a voltage converter circuit diagram including a head switch in accordance with an exemplary embodiment.

FIG. 3 illustrates a voltage converter circuit diagram including a head switch in accordance with an exemplary embodiment. The head switch in FIG. 3 uses an NMOS transistor, $M_{HD}$, to deliver the current to the load, and overcomes the above noted degradation in ohmic loss. A flying capacitor (or a capacitor that is not connected to ground) is connected to the supply voltage, $V_{Batt}$, through a switch $SW_{FL}$, which in turn is driven (turned on/off) in response to an input $V_{HD}$. In this example $SW_{FL}$ is implemented with PMOS transistor. FIG. 3 illustrates that $V_{HD}$ is applied to a first one of two drivers that are connected in series. It is understood, however, that fewer or additional drivers can generally be used based on the capacitive loading from switch $M_{HD}$. The supply terminals of the drivers (also sometimes referred to as buffer or buffers) are coupled to the flying capacitor. During the operation, the various phases of the operation is controlled by, for example, a processor or a controller, or by another circuit that provides signals and voltages, such as indications as to when the application becomes active, $V_{HD}$ becomes high/low, and various switches are turned on an off. For example, at the beginning of the cycle (e.g., in an idle mode when the application is not active), $SW_{arb}$ is closed, $SW_{dn}$ is closed, and $V_{HD}$ is low (see also, FIG. 4). As a result, $V_{ind}$ is at ground level, and $V_{F\_HD}$ is low. $SW_{FL}$ is also closed which charges the $C_{Fly}$ capacitor to $V_{Batt}$. In the next phase (e.g., when the application becomes active), $SW_{arb}$ is open, and $V_{HD}$ is a high voltage. As $V_{HD}$ goes high, $V_{F\_HD}$ is triggered through the capacitive coupling of $C_{Fly}$, partially turning ON $M_{HD}$. As a result, $V_{Ind}$ jumps to $V_{App}$. Since the $C_{Fly}$ capacitor is already charged to $V_{Batt}$, $V_{F\_HD}$ jumps to $V_{Batt}+V_{App}$, fully turning ON the switch $M_{HD}$. Therefore, gate to source voltage ($V_{GS}$) on the switch, $M_{HD}$, is always equal to $V_{Batt}$ (when $M_{HD}$ is on) regardless of the application voltage, $V_{App}$, and the switch is turned ON at full strength. Note that $SW_{FL}$ is an active low switch that is turned on when $V_{F\_HD}$ is lower than $V_{Batt}$; thus in the exemplary configuration of FIG. 3, $SW_{FL}$ can be implemented as a PMOS transistor. When $V_{F\_HD}$ jumps to $V_{Batt}+V_{App}$, $SW_{FL}$ also turns off. In other embodiments, other types of active low switches can be used to implement $SW_{FL}$.

Figure 4:
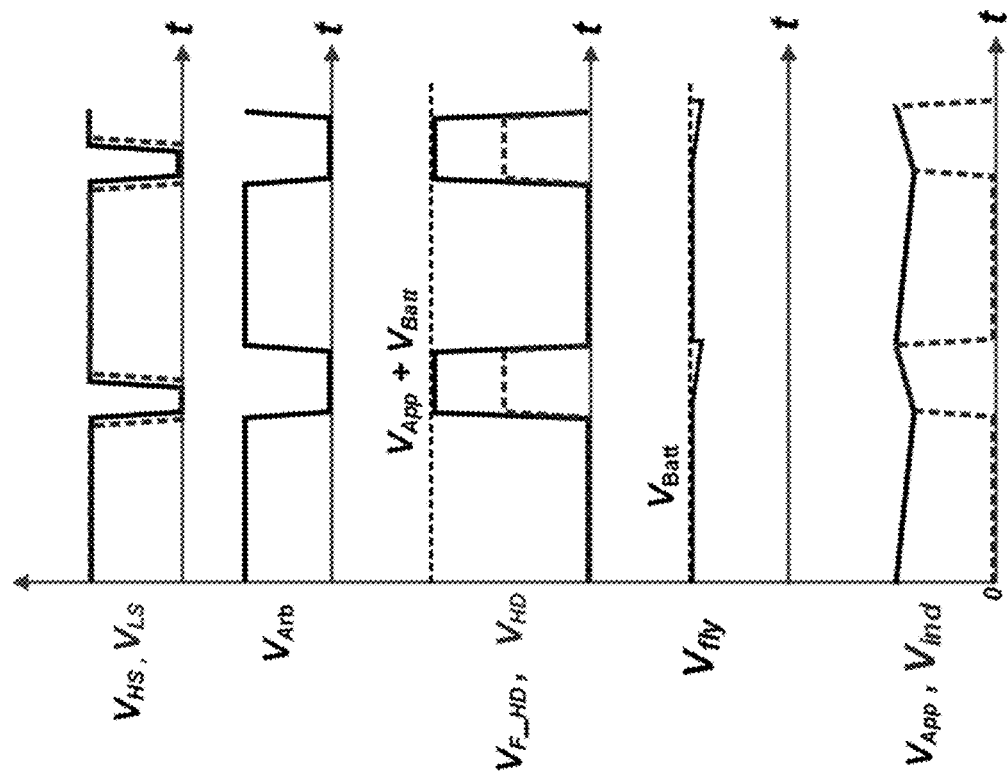
FIG. 4 illustrates a set of exemplary voltage versus time waveforms for different nodes in the circuit of FIG. 3 at different phases of operation.

FIG. 4 shows a set of waveforms for different nodes in the circuit of FIG. 3 at different phases of operation, as described above. In producing the waveforms of FIG. 4 it is assumed that $SW_{UP}$ is implemented using a PMOS transistor, while $SW_{DN}$, and $SW_{arb}$ are implemented using NMOS transistors. The buffers for each switch are identified using the $BUF_{SW}$ notation. Note that the small ripple on $V_{Fly}$ is due to the loading effects of the output capacitor. Also note that in FIG. 4, when transistor $M_{HD}$ is ON, $V_{GS}$ is equal to $V_{Fly}$ (which is equal to $V_{Batt}$). As such, the dependence of $V_{GS}$ of the floating switch on the application voltage is eliminated or is at least significantly reduced, enabling the NMOS transistor, $M_{HD}$, to operate at a low ohmic loss. Furthermore, such a benefit is achieved without increasing the size of the transistor, thus maintaining the switching losses at a particular level.

Another aspect of the disclosed embodiments relates to improving the efficiency of a DC-DC converter by controlling the leakage current and ohmic losses based on transistor body voltage bias levels. Leakage current is another impediment in achieving high efficiencies in switching converters in low power applications (where the load current is small, for example, in the range of few µA). The leakage current is often associated with large power switches that reside inside the power management IC. The nature of the leakage is mainly sub-threshold leakage, which is due to the existence of an electric field across the source-drain area of the transistors. When the transistor is OFF, large voltage drops on the drain to source voltage, $V_{DS}$, results in a large electric field, and generates the leakage currents.

Figure 5:
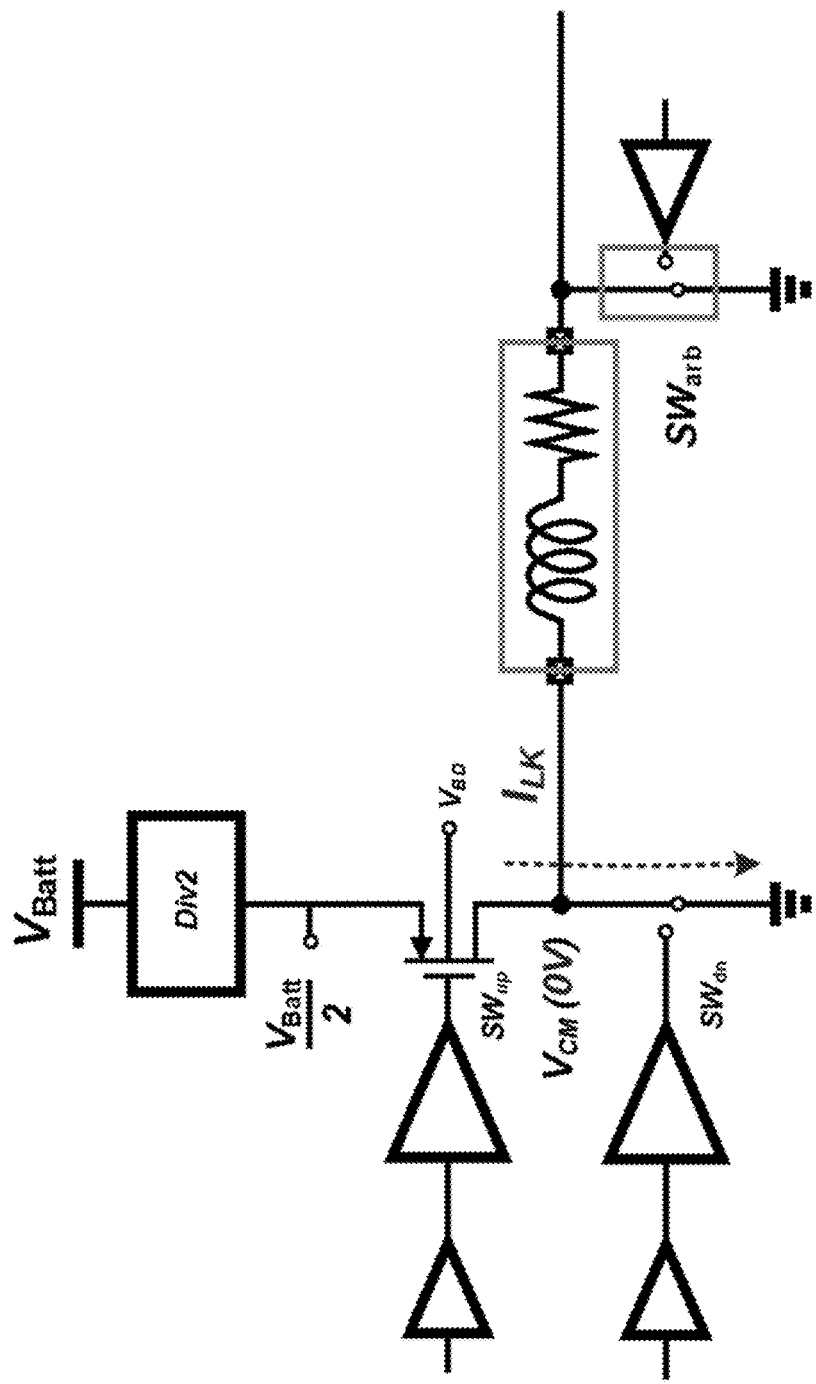
FIG. 5 illustrates an exemplary circuit including a PMOS transistor with a body bias configuration.

In thick oxide devices, the leakage is a strong function of the body bias voltage. Since leakage currents are a function of device threshold voltage, $V_{th}$, well biasing or body biasing can reduce leakage power. In this technique, the body or the appropriate well is biased to raise the transistor thresholds, and thus reduce the leakage. As an example, for PMOS transistor shown in FIG. 5, if the body potential is larger than source potential, the region is heavily depleted, and fewer free electrons are available to be moved by the direction of source to drain electric field. As a result, leakage current decreases. At the same time, since the source to body is reverse biased, the switch ON resistance increases. This effect acts in a similar way as mobility degradation for a PMOS transistor.

Figure 6:
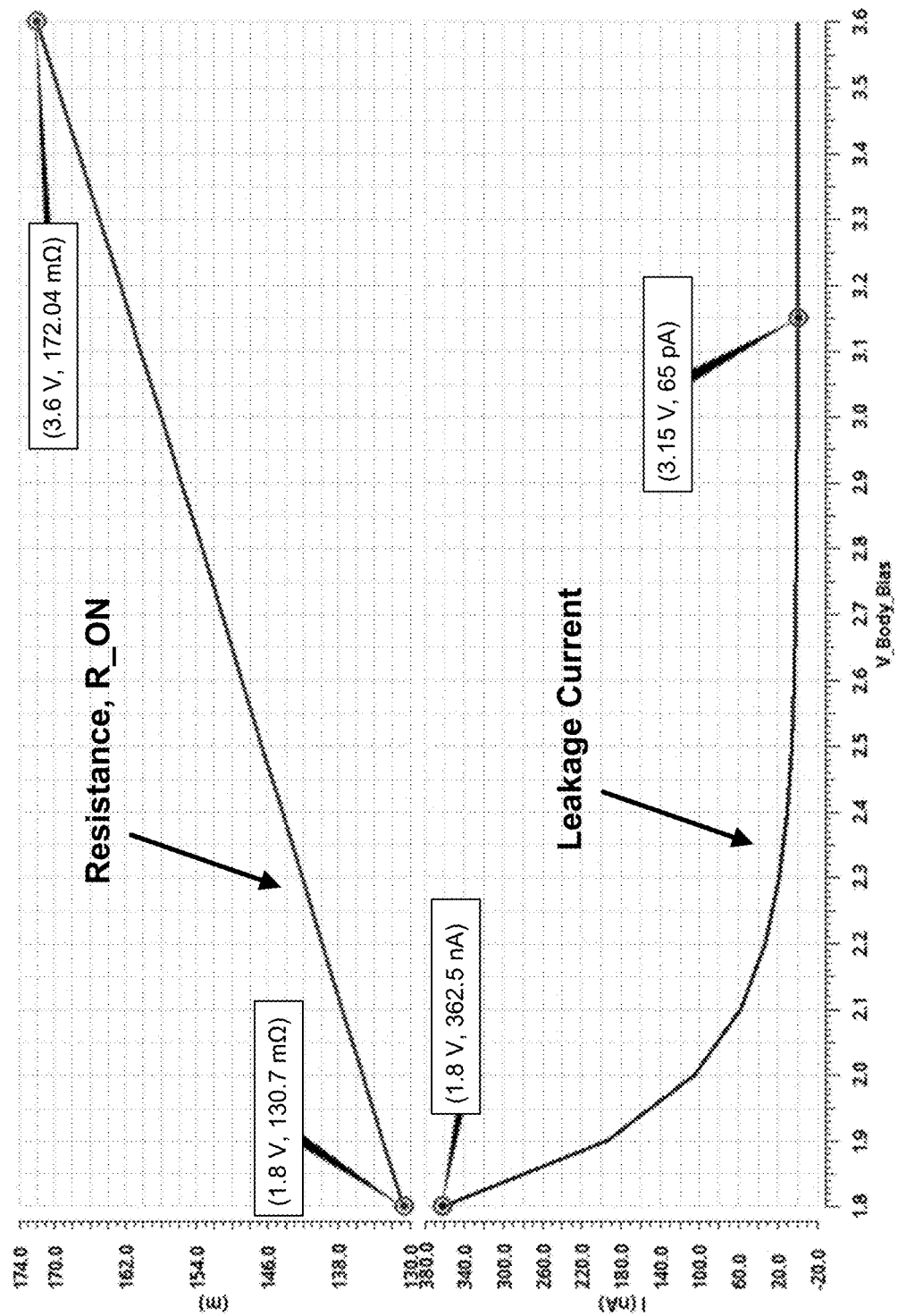
FIG. 6 illustrates exemplary simulation results for a leakage current and switch ON resistance as a function of body bias voltage for a PMOS power transistor.

FIG. 6 shows the simulation results for the leakage current and the switch ON resistance as a function of body bias voltage for a PMOS power transistor. In these plots, by the way of example and not by limitation, it is assumed that the body bias voltage change is restricted to the range 1.8V to 3.6V. As evident from the bottom plot of FIG. 6, the leakage current decreases as the body potential increases. The top plot in FIG. 6 further illustrates that the ON resistance is linearly proportional to the body bias voltage value. It should be noted that in this simulation, the source of the transistor $SW_{UP}$ (see, e.g., FIG. 7) is connected to a divide-by-2 (DIV2) output voltage of the battery ($V_{Batt}/2$), where $V_{Batt}$ is set to 3.6 V. In some power management ICs (PMICs), a DIV2 block is provided, and can be used to manage the leakage current as described herein. It should be noted, however, that the scope of the disclosed embodiments is not limited to a voltage produced by a divide-by-two circuit, and voltages provided by a divide-by-n circuit can be also be used consistent with the disclosed embodiments. Referring back to the bottom plot in FIG. 6, when the switch is off, and the $V_{Body\_Bias}$ is at, or about, 1.8V, the leakage current is high. However, when is $V_{Body\_Bias}$ is increased to 3.6V, the leakage current is significantly reduced. However, increasing $V_{Body\_Bias}$ also increases the switch ON resistance, which leads to power loss (when the switch is turned ON). While the balancing act between these two factors is a consideration for selecting the proper operating point, if the switch is operating in an OFF mode, the losses due to the leakage current have a more significant impact on the overall efficiency.

Figure 7:
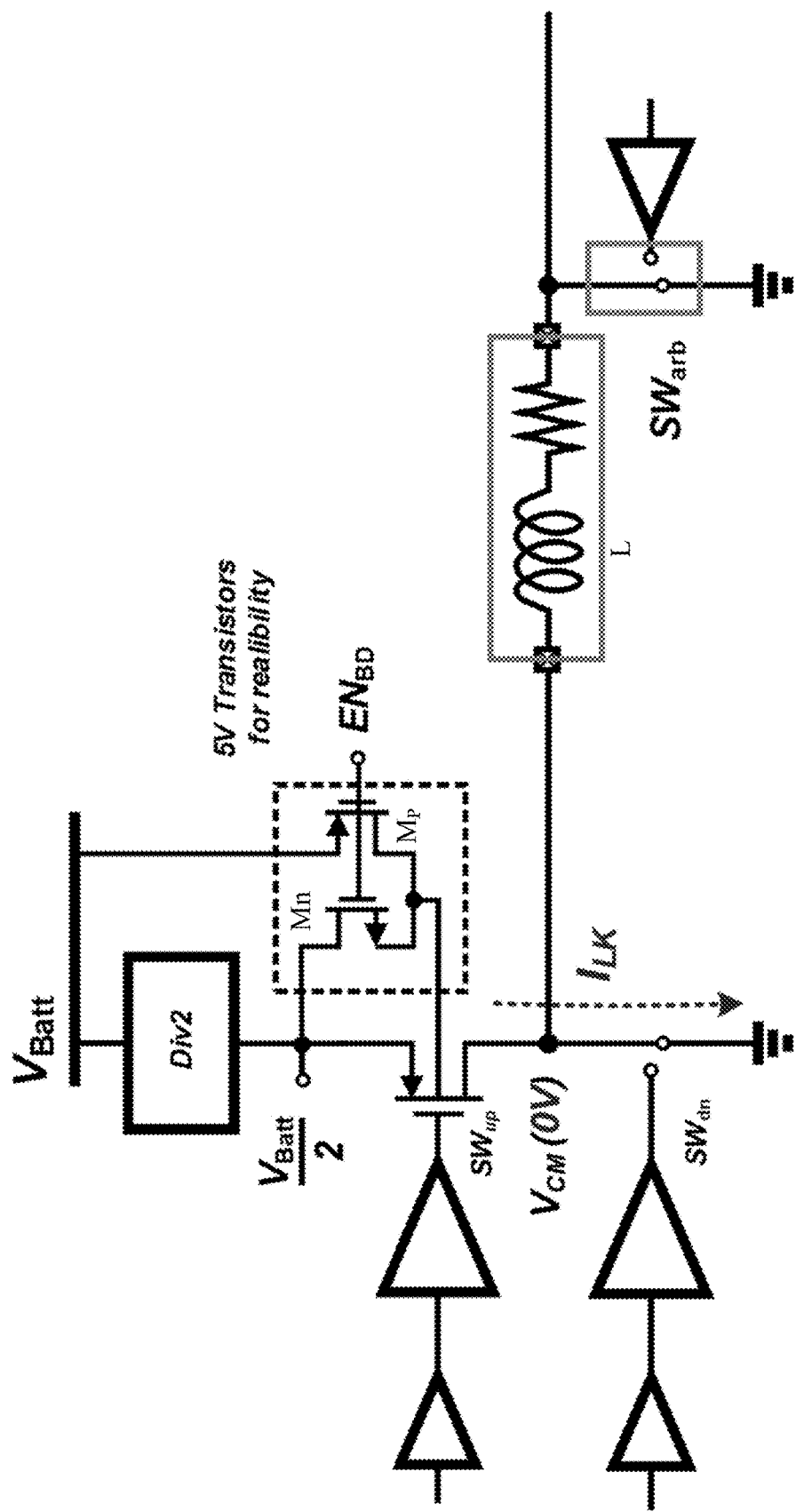
FIG. 7 illustrates a circuit for improving the efficiency of a switch while reducing leakage current and ohmic loss in accordance with an exemplary embodiment.

FIG. 7 illustrates a circuit for improving the efficiency of a switch while reducing leakage current and ohmic loss in accordance with an exemplary embodiment. In the circuit of FIG. 7, a combination of an NMOS ($M_n$) and a PMOS ($M_P$) is connected to the body bias terminal of the PMOS power switch, $SW_{UP}$. The operation is controlled by a body enable, $EN_{BD}$, input, which can be provided by, for example, a controller or a processor. In operation, in a low power mode of operation (e.g., idle mode when the load current is, for example, in the microampere range), $EN_{BD}$ is turned low, which causes the PMOS switch ($M_p$) to turn ON, connecting $V_{Batt}$ to the body bias terminal of $SW_{UP}$. As such, in low power mode, the leakage current is significantly reduced. In a high power mode (e.g., when the load current is, for example, in milliampere range), $EN_{BD}$ is turned high, causing the PMOS switch ($M_p$) to turn OFF and the NMOS switch ($M_n$) to turn ON, connecting $V_{Batt}/2$ to the body bias terminal of $SW_{UP}$. As a result, the switch resistance is lowered. As noted earlier, in a high power mode of operation where the switch is substantially ON, the resistive losses are dominant (compared to the losses due to the leakage current), and thus it is desirable to reduce the ohmic losses as much as possible. In some exemplary embodiments, the two switches, $M_n$ and $M_p$, in the body biasing technique are 5V transistors, which can tolerate large $V_{DS}$ voltages. The body of the NMOS transistor is connected to ground, and the body of the PMOS transistor is connected to $V_{Batt}$. The Table in FIG. 8 shows that adding body biasing to the design can improve the efficiency from about 65% to 82%.

While in the above examples the body bias voltage is described as toggling between two voltages ($V_{Batt}/2$ and $V_{Batt}$), the body bias voltage values can change within a larger range of voltages, a smaller range of voltages and/or at more granular steps. For example, in some embodiments, the body bias voltage can switch between N (N≥2) possible values in range $V_{Batt}/2$ to $V_{Batt}$, or in a different range of bias voltage values. In one example implementation, this can be achieved by connecting the body of the transistor to the output of a buffer and setting the buffer output to a reference voltage. By changing the reference voltage, the body voltage changes, as well, and the intended performance for the switch can be achieved.

It should be also noted that while the switch $SW_{UP}$ is shown to be a PMOS transistor, in some embodiments the body bias voltage of an NMOS switch can be controlled in a similar manner as described above, while keeping in mind that biasing voltages of opposite polarity (compared to PMOS) should be used.

Figure 9:
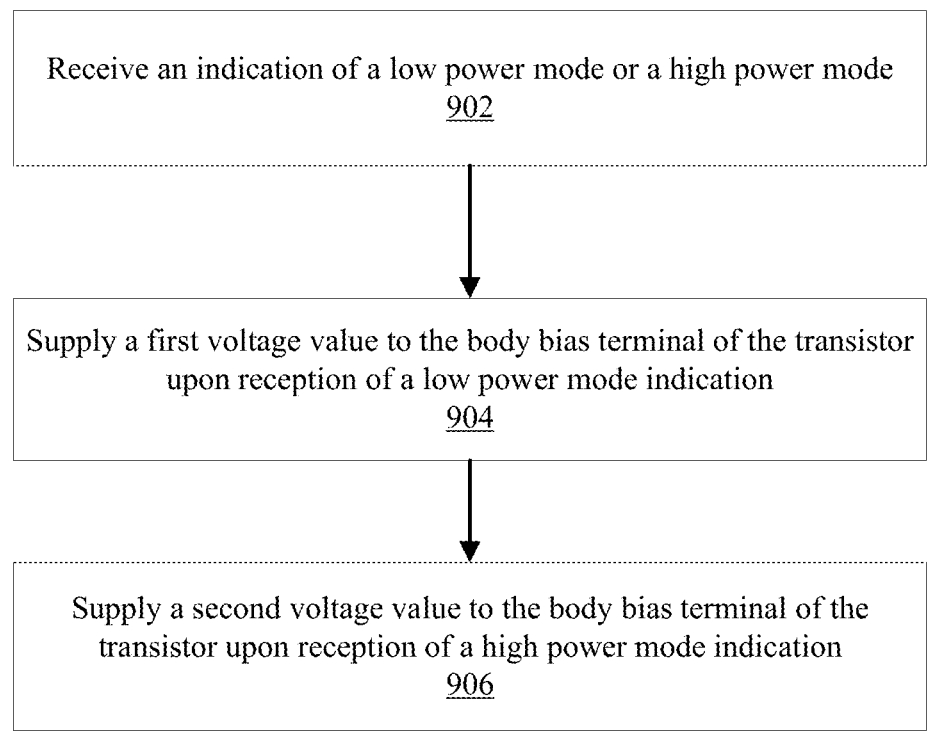
FIG. 9 illustrates a set of operations that can be carried out to reduce energy loss in a switch comprising a transistor having a body bias terminal in accordance with an exemplary embodiment.

FIG. 9 illustrates a set of operations that can be carried out to reduce energy loss in a switch comprising a transistor having a body bias terminal in accordance with an exemplary embodiment. At 902, an indication of a low power mode or a high power mode is received. For example, the indications can be received in a sequence (i.e., temporally separated) to signal that the switch is operating in a low or a high mode of operation. At 904, a first voltage value is supplied to the body bias terminal of the transistor upon reception of a low power mode indication. At 904, a second voltage value is supplied to the body bias terminal of the transitory that is a fraction of the first voltage value upon reception of a high power mode indication. In these operations, the transistor is off in the low power mode and the transistor is at least partially turned on in the high power mode. Additionally, the first voltage value causes a leakage current of the transistor to be lower than a leakage current when the second voltage value is supplied to the body bias terminal, and the second voltage value causes a resistance of the transistor to be lower than a resistance of the transistor when the first voltage value is supplied to the body bias terminal and the transistor is at least partially turned on.

One aspect of the disclosed embodiments relates to a voltage converter that includes a voltage source, an output, an inductor to deliver a current to the output, and a floating switch coupled to the inductor and to the output and configured to be activated or deactivated based on an input voltage. The floating switch includes an n-type metal oxide semiconductor (NMOS) transistor having a source terminal coupled to the inductor and a drain terminal coupled to the output, and configured to deliver a current from the inductor to the output upon activation of the NMOS transistor. The floating switch further includes a capacitor comprising a first end and a second end, where the capacitor is coupled to the voltage source at the first end and is coupled to the source terminal of the NMOS transistor at the second end. The floating switch also includes one or more drivers, each configured to receive supply voltages from the first and the second ends of the capacitor, where an output of the one or more drivers is coupled to a gate terminal of the NMOS transistor. The floating switch also includes an active low switch coupled to the voltage source, to the gate terminal of the NMOS transistor, and to the capacitor. The active low switch is also coupled to, and is controlled by, the output of the one or more drivers and is configured to turn on or off in response to a change in the input voltage.

In one example embodiment, upon activation of the NMOS transistor, the gate-to-source voltage of the NMOS transistor remains substantially constant and equal to a voltage source output value regardless of changes in voltage values at the output. According to another example embodiment, the active low switch includes a p-type metal oxide semiconductor (PMOS) transistor. In one example embodiment, the active low switch is configured to activate in response to a low voltage value in the input voltage, and to deactivate in response to a high voltage value in the input voltage. According to an embodiment, the voltage converter switch is configured to reduce ohmic losses associated with an operation of the floating switch when the floating switch is activated.

In another example embodiment, the floating switch does not include any p-type metal oxide semiconductor (PMOS) transistors in a current delivery path from the inductor to the output. In one example embodiment, a low voltage value of the input voltage is indicative of a low power mode or an idle mode of operation and configures the floating switch to be deactivated. In another example embodiment, a high voltage value of the input voltage is indicative of a high power mode or an active mode of operation and configures the floating switch be activated.

Another aspect of the disclosed embodiments relates to a floating switch coupled to an input and an output node. The floating switch includes an n-type metal oxide semiconductor (NMOS) transistor having a source terminal coupled to the input node and a drain terminal coupled to the output node, and configured to deliver a current from the input node to the output node upon activation of the NMOS transistor. The floating switch also includes a capacitor that includes a first end and a second end. The capacitor is coupled to a voltage source at the first end and is coupled to the source terminal of the NMOS transistor at the second end. The floating switch further includes one or more drivers, each configured to receive positive and negative supply voltages from the first and the second ends of the capacitor. The one or more drivers are configured to receive an input voltage, and the one or more drivers include an output that is coupled to a gate terminal of the NMOS transistor. The floating switch also includes an active low switch coupled to the voltage source, to the gate terminal of the NMOS transistor, and to the capacitor. The active low switch is also coupled to, and is controlled by, an output of the one or more drivers and is configured to turn on or off in response to a change in the input voltage.

Another aspect of the disclosed embodiments relates to a switch that includes a first transistor configured to allow a current to flow through the transistor upon activation of the transistor. The transistor includes a body bias terminal to allow a body bias voltage to be applied to the transistor. The switch also includes a body bias circuit configured to supply the body bias voltage to the body bias terminal of the first transistor. The body bias circuit includes a p-type metal oxide semiconductor (PMOS) transistor including a gate, a drain and a source; the gate of the PMOS transistor is coupled to an enable input, the source of the PMOS transistor is coupled to a voltage supply having a substantially constant valued voltage supply value, and the drain of the PMOS transistor is coupled to the body bias terminal of the first transistor. The body bias circuit also includes an n-type metal oxide semiconductor (NMOS) transistor including a gate, a drain and a source; the gate of the NMOS transistor is coupled to the enable input, the drain of the NMOS transistor is coupled to a voltage divider circuit having a voltage value that is a fraction of the voltage supply value, and the source of the NMOS transistor is coupled to the body bias terminal of the first transistor.

In one example embodiment, the PMOS transistor of the body bias circuit is configured, upon receiving a first voltage value on the enable input, to turn on and provide the voltage supply value to the body bias terminal of the first transistor, and the NMOS transistor of the body bias circuit is configured, upon receiving the first voltage value on the enable input, to turn off. In another example embodiment, the NMOS transistor is configured, upon receiving a second voltage value that is different from the first voltage value on the enable input, to turn on and provide the voltage value that is a fraction of the voltage supply value to the body bias terminal of the first transistor, and the PMOS transistor is configured, upon receiving the second voltage value on the enable input, to turn off. In yet another example embodiment, the first voltage value is a negative voltage value and the second voltage value is a positive voltage value.

According to one example embodiment, the first voltage value is indicative of a low power mode of operation where the first transistor is off, and the second voltage value is indicative of a high power mode of operation where the first transistor is on. In another example embodiment, the voltage supply value upon application to the body bias terminal causes the first transistor to have a lower leakage current level relative to a scenario in which the body bias voltage is a fraction of the voltage supply value. In yet another example embodiment, the fraction of the voltage supply value upon application to the body bias terminal causes the first transistor, when turned on, to operate at a lower resistance level relative to a scenario in which the body bias voltage is equal to the voltage supply value.

According to another example embodiment, the first transistor is a p-type metal oxide semiconductor (PMOS) transistor. In one example embodiment, the fraction of the supply voltage value is one-half of the supply voltage value. In yet another example embodiment, the switch is part of a voltage converter circuit.

Another aspect of the disclosed embodiments relates to a switch that includes a transistor including a body bias terminal to allow a body bias voltage to be applied to the transistor, and a body bias circuit configured to receive an enable input, and to supply a first body bias voltage value to the body bias terminal responsive to a first value on the enable input and to supply a second body bias voltage value that is a fraction of the first body bias voltage value to the body bias terminal responsive to a second value on the enable input.

The subject matter described herein may be embodied in systems, apparatus, methods, and/or articles depending on the desired configuration. For example, at least a portion of the systems, apparatus, methods, and/or articles described herein can be implemented using one or more of the following: one or more semiconductor materials or substrates such as silicon, printed circuit board techniques, discrete electronic components such as transistors, inductors, capacitors, resistors, and the like, a processor executing program code, an application-specific integrated circuit (ASIC), a digital signal processor (DSP), an embedded processor, a field programmable gate array (FPGA), and/or combinations thereof. These various example embodiments may include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. In the context of this document, a "machine-readable medium" may be any non-transitory media that can contain, store, communicate, propagate or transport the instructions for use by or in connection with an instruction execution system, apparatus, or device, such as a computer or data processor circuitry. A computer-readable medium may comprise a non-transitory computer-readable storage medium that may be any media that can contain or store the instructions for use by or in connection with an instruction execution system, apparatus, or device, such as a computer. Furthermore, some of the embodiments disclosed herein include computer programs configured to cause methods as disclosed herein.

Although a few variations have been described in detail above, other modifications or additions are possible. In particular, further features and/or variations may be provided in addition to those set forth herein. Moreover, the example embodiments described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A voltage converter, comprising:
    a voltage source;
    an output;
    an inductor to deliver a current to the output; and
    a floating switch coupled to the inductor and to the output, and configured to be activated or deactivated based on an input voltage, the floating switch comprising:
        an n-type metal oxide semiconductor (NMOS) transistor having a source terminal coupled to the inductor and a drain terminal coupled to the output, and configured to deliver a current from the inductor to the output upon activation of the NMOS transistor;
        a capacitor comprising a first end and a second end, the capacitor coupled to the voltage source at the first end and coupled to the source terminal of the NMOS transistor at the second end;
        one or more drivers, each configured to receive supply voltages from the first and the second ends of the capacitor, wherein an output of the one or more drivers is coupled to a gate terminal of the NMOS transistor; and
        an active low switch coupled to the voltage source, to the gate terminal of the NMOS transistor, and to the capacitor, the active low switch also coupled to, and controlled by, the output of the one or more drivers and configured to turn on or off in response to a change in the input voltage.

2. The voltage converter of claim 1, wherein, upon activation of the NMOS transistor, the gate-to-source voltage of the NMOS transistor remains substantially constant and equal to a voltage source output value regardless of changes in voltage values at the output.

3. The voltage converter of claim 1, wherein the active low switch includes a p-type metal oxide semiconductor (PMOS) transistor.

4. The voltage converter of claim 1, wherein the active low switch is configured to activate in response to a low voltage value in the input voltage, and to deactivate in response to a high voltage value in the input voltage.

5. The voltage converter of claim 1, configured to reduce ohmic losses associated with an operation of the floating switch when the floating switch is activated.

6. The voltage converter of claim 1, wherein the floating switch does not include any p-type metal oxide semiconductor (PMOS) transistors in a current delivery path from the inductor to the output.

7. The voltage converter of claim 1, wherein a low voltage value of the input voltage is indicative of a low power mode or an idle mode of operation and configures the floating switch to be deactivated.

8. The voltage converter of claim 1, wherein a high voltage value of the input voltage is indicative of a high power mode or an active mode of operation and configures the floating switch be activated.

9. A floating switch coupled to an input and an output node, comprising:
    an n-type metal oxide semiconductor (NMOS) transistor having a source terminal coupled to the input node and a drain terminal coupled to the output node, and configured to deliver a current from the input node to the output node upon activation of the NMOS transistor;
    a capacitor comprising a first end and a second end, the capacitor coupled to a voltage source at the first end and coupled to the source terminal of the NMOS transistor at the second end;
    one or more drivers, each configured to receive positive and negative supply voltages from the first and the second ends of the capacitor, wherein the one or more drivers are configured to receive an input voltage, the one or more drivers including an output that is coupled to a gate terminal of the NMOS transistor; and an active low switch coupled to the voltage source, to the gate terminal of the NMOS transistor, and to the capacitor, the active low switch also coupled to, and controlled by, an output of the one or more drivers and configured to turn on or off in response to a change in the input voltage.

10. A switch, comprising:
a first transistor configured to allow a current to flow through the transistor upon activation of the transistor, the transistor including a body bias terminal to allow a body bias voltage to be applied to the transistor; and
a body bias circuit configured to supply the body bias voltage to the body bias terminal of the first transistor, the body bias circuit comprising:
  a p-type metal oxide semiconductor (PMOS) transistor including a gate, a drain and a source, wherein the gate of the PMOS transistor is coupled to an enable input, the source of the PMOS transistor is coupled to a voltage supply having a substantially constant valued voltage supply value, and the drain of the PMOS transistor is coupled to the body bias terminal of the first transistor, and
  an n-type metal oxide semiconductor (NMOS) transistor including a gate, a drain and a source, wherein the gate of the NMOS transistor is coupled to the enable input, the drain of the NMOS transistor is coupled to a voltage divider circuit having a voltage value that is a fraction of the voltage supply value, and the source of the NMOS transistor is coupled to the body bias terminal of the first transistor.

11. The switch of claim 10, wherein the PMOS transistor is configured, upon receiving a first voltage value on the enable input, to turn on and provide the voltage supply value to the body bias terminal of the first transistor, and the NMOS transistor is configured, upon receiving the first voltage value on the enable input, to turn off.

12. The switch of claim 11, wherein the NMOS transistor is configured, upon receiving a second voltage value that is different from the first voltage value on the enable input, to turn on and provide the voltage value that is a fraction of the voltage supply value to the body bias terminal of the first transistor, and the PMOS transistor is configured, upon receiving the second voltage value on the enable input, to turn off.

13. The switch of claim 12, wherein the first voltage value is a negative voltage value and the second voltage value is a positive voltage value.

14. The switch of claim 12, wherein the first voltage value is indicative of a low power mode of operation where the first transistor is off, and the second voltage value is indicative of a high power mode of operation where the first transistor is on.

15. The switch of claim 10, wherein the voltage supply value upon application to the body bias terminal causes the first transistor to have a lower leakage current level relative to a scenario in which the body bias voltage is a fraction of the voltage supply value.

16. The switch of claim 10, wherein the fraction of the voltage supply value upon application to the body bias terminal causes the first transistor, when turned on, to operate at a lower resistance level relative to a scenario in which the body bias voltage is equal to the voltage supply value.

17. The switch of claim 10, wherein the first transistor is a p-type metal oxide semiconductor (PMOS) transistor.

18. The switch of claim 10, wherein the fraction of the supply voltage value is one-half of the supply voltage value.

19. The switch of claim 10, wherein the switch is part of a voltage converter circuit.

20. A switch, comprising:
a transistor including a body bias terminal to allow a body bias voltage to be applied to the transistor; and
a body bias circuit configured to receive an enable input, and to supply a first body bias voltage value to the body bias terminal responsive to a first value on the enable input and to supply a second body bias voltage value that is a fraction of the first body bias voltage value to the body bias terminal responsive to a second value on the enable input.

* * * * *